United States Patent
Humeida et al.

(10) Patent No.: US 11,240,283 B2
(45) Date of Patent: Feb. 1, 2022

(54) METHODS AND APPARATUS FOR THE ENCODING OF AUDIO AND/OR VIDEO DATA

(71) Applicant: BRITISH TELECOMMUNICATIONS PUBLIC LIMITED COMPANY, London (GB)

(72) Inventors: Yousif Humeida, London (GB); Ian Kegel, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/639,325

(22) PCT Filed: Aug. 14, 2018

(86) PCT No.: PCT/EP2018/071996
§ 371 (c)(1),
(2) Date: Feb. 14, 2020

(87) PCT Pub. No.: WO2019/034640
PCT Pub. Date: Feb. 21, 2019

(65) Prior Publication Data
US 2021/0037080 A1    Feb. 4, 2021

(30) Foreign Application Priority Data
Aug. 14, 2017 (EP) .................... 17186200

(51) Int. Cl.
*H04L 29/06*    (2006.01)
*G10L 19/16*    (2013.01)
(Continued)

(52) U.S. Cl.
CPC .......... *H04L 65/607* (2013.01); *G10L 19/167* (2013.01); *H04L 43/08* (2013.01); *H04L 65/80* (2013.01)

(58) Field of Classification Search
CPC ....................................................... H04L 65/607
(Continued)

(56) References Cited

U.S. PATENT DOCUMENTS 6,271,845 B1 * 8/2001 Richardson ......... H04L 41/0893
715/764
7,617,337 B1 * 11/2009 Beck ....................... H04L 65/80
370/229

(Continued)

FOREIGN PATENT DOCUMENTS

| | | |
|---|---|---|
| CN | 102394993 | 3/2012 |
| CN | 105830377 | 8/2016 |

(Continued)

OTHER PUBLICATIONS

"Network model for evaluating multimedia transmission performance over Internet Protocol", ITU Recommendation G.1050, International Telecommunication Union, Telecommunication Standardization Sector of ITU, Jul. 2016, 114 pages, https://www.itu.int/rec/T-REC-G.1050-201607-I/en.

(Continued)

*Primary Examiner* — Jude Jean Gilles
(74) *Attorney, Agent, or Firm* — Nixon & Vanderhye PC

(57) ABSTRACT

Methods and apparatus are disclosed for selecting encoding specifications for encoding audio and/or video data to be streamed from a sender to a receiver via a network. Methods and apparatus for encoding data using a selected encoding specification, and for streaming data which has been encoded using a selected encoding specification from a sender to a receiver via a network are also disclosed. The (Continued)

Computer System selecting method comprises selecting an encoding specification (s930) in dependence on performance measures (86) previously obtained using a plurality of different encoding specifications in respect of a monitored network when in each of a plurality of different network conditions (87), respective network conditions being characterised by different combinations of data-transmission characteristics.

15 Claims, 9 Drawing Sheets

(51) Int. Cl.
*H04L 12/26* (2006.01)
*H04N 21/222* (2011.01)
*H04N 21/24* (2011.01)
*H04N 21/6379* (2011.01)

(58) Field of Classification Search
USPC ....... 709/200, 217, 226, 237, 233, 231, 224, 709/204, 235, 247, 213, 228, 229, 230
See application file for complete search history.

(56) References Cited

U.S. PATENT DOCUMENTS

| | | | |
|---|---|---|---|
| 7,768,998 | B1 | 8/2010 | Everson et al. |
| 8,397,269 | B2* | 3/2013 | Barrett ................ H04L 47/12 725/120 |
| 9,866,610 | B2 | 1/2018 | Poulin |
| 2002/0037715 | A1* | 3/2002 | Mauney ............... H04M 1/724 455/421 |
| 2002/0167936 | A1 | 11/2002 | Goodman |
| 2003/0140159 | A1* | 7/2003 | Campbell ............ H04L 69/165 709/231 |
| 2004/0032860 | A1 | 2/2004 | Mundra et al. |
| 2004/0071216 | A1 | 4/2004 | Richardson et al. |
| 2004/0193974 | A1 | 9/2004 | Quan et al. |
| 2005/0100229 | A1* | 5/2005 | Becker ................ H04N 19/147 382/232 |
| 2005/0201414 | A1 | 9/2005 | Awais |
| 2006/0036729 | A1* | 2/2006 | Sakaguchi ............ H04L 43/02 709/224 |
| 2008/0049624 | A1 | 2/2008 | Ray et al. |
| 2009/0201988 | A1 | 8/2009 | Gazier et al. |
| 2009/0254657 | A1* | 10/2009 | Melnyk ............. H04N 21/6583 709/224 |
| 2010/0046664 | A1 | 2/2010 | Erving et al. |
| 2011/0270967 | A1 | 11/2011 | Qiu et al. |
| 2011/0317543 | A1 | 12/2011 | Medina et al. |
| 2012/0296656 | A1* | 11/2012 | Smyth ................... G10L 19/22 704/500 |
| 2012/0296658 | A1* | 11/2012 | Smyth ................... G10L 19/22 704/500 |
| 2013/0031575 | A1* | 1/2013 | Gallant ............. H04L 41/5038 725/20 |
| 2013/0156119 | A1 | 6/2013 | Poulin |
| 2013/0215774 | A1 | 8/2013 | Bender et al. |
| 2014/0067405 | A1 | 3/2014 | Patel et al. |
| 2014/0325020 | A1* | 10/2014 | Igarashi ............. H04N 21/4621 709/217 |
| 2014/0337473 | A1* | 11/2014 | Frusina .............. H04N 21/6131 709/217 |
| 2014/0375484 | A1 | 12/2014 | Jin et al. |
| 2015/0163273 | A1* | 6/2015 | Radcliffe .............. H04L 47/125 709/231 |
| 2015/0200826 | A1 | 7/2015 | Assem et al. |
| 2015/0200993 | A1 | 7/2015 | Assem et al. |
| 2015/0222939 | A1* | 8/2015 | Gallant ................. H04L 43/062 725/9 |
| 2015/0271072 | A1* | 9/2015 | Moreman ........... H04L 65/4084 709/213 |
| 2016/0301960 | A1* | 10/2016 | Sze ...................... H04N 21/222 |
| 2016/0359942 | A1 | 12/2016 | Li et al. |
| 2017/0214791 | A1 | 7/2017 | Gedge et al. |
| 2019/0037173 | A1* | 1/2019 | Lee ........................ H04W 76/15 |
| 2021/0037080 | A1* | 2/2021 | Humeida ................ H04L 43/08 |

FOREIGN PATENT DOCUMENTS

| | | |
|---|---|---|
| EP | 2 897 337 | 7/2015 |
| WO | 2007/062418 | 5/2007 |

OTHER PUBLICATIONS

A. Lakaniemi et al., "Subjective VoIP speech quality evaluation based on network measurements," ICC 2001, IEEE International Conference on Communications. Conference Record (Cat. No. 01CH37240), Helsinki, Finland, 2001, vol. 3, pp. 748-752, http://ieeexplore.ieee.org/stamp/stamp.jsp?arnumber=937339.
International Search Report and Written Opinion of the ISA for PCT/EP2018/071996 dated Sep. 20, 2018, 11 pages.
Extended European Search Report for EP Application No. 17186200.6 dated Jan. 31, 2018, 8 pages.
Search Report for GB Application No. 1713012.1 dated Jan. 9, 2018, 5 pages.
Examination Report issued for GB2001280 3 dated Nov. 20, 2020 (2 pages).
International Preliminary Report on Patentability issued for PCT/EP2020/052267 dated Jan. 26, 2021(12 pages).
Search Report issued for GB2001280.3 dated Jun. 1, 2020 (4 pages).
International Search Report and Written Opinion issued for PCT/EP2020/052267 dated Feb. 26, 2020 (15 pages).
Extended European Search Report issued for EP19154698 5 dated Apr. 8, 2019 (8 pages).
U.S. Appl. No. 17/427,578, filed Jul. 30, 2021 (30 pages).
Office Action issued in CN 201880064476.8, dated Sep. 29, 2021, 11 pages.
English Translation of an Office Action issued in CN 201880064476.8, dated Sep. 29, 2021, 14 pages.
Examination Report issued in EP 18750463.4, dated Nov. 4, 2021, 7 pages.

* cited by examiner

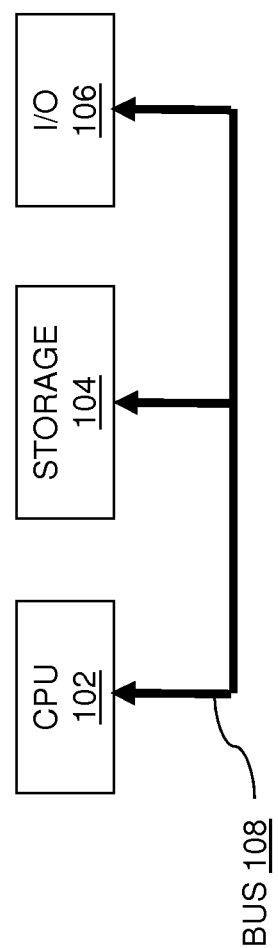
Figure 1 - Computer System

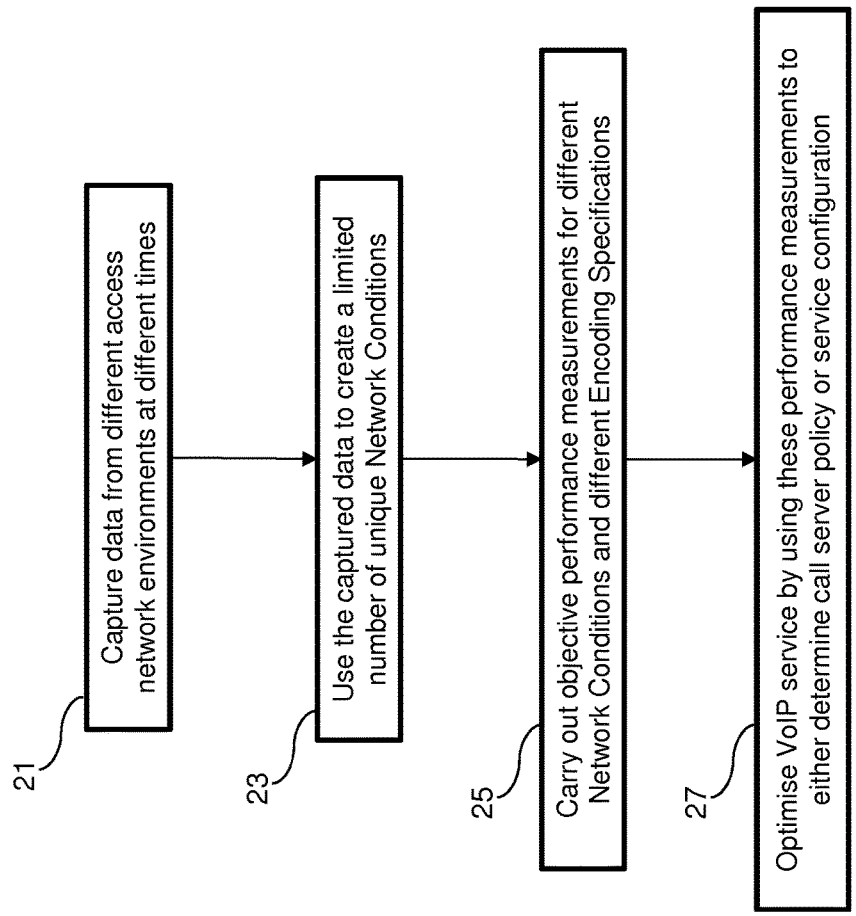
Figure 2: Schematic of Process Phases in a Preferred Embodiment

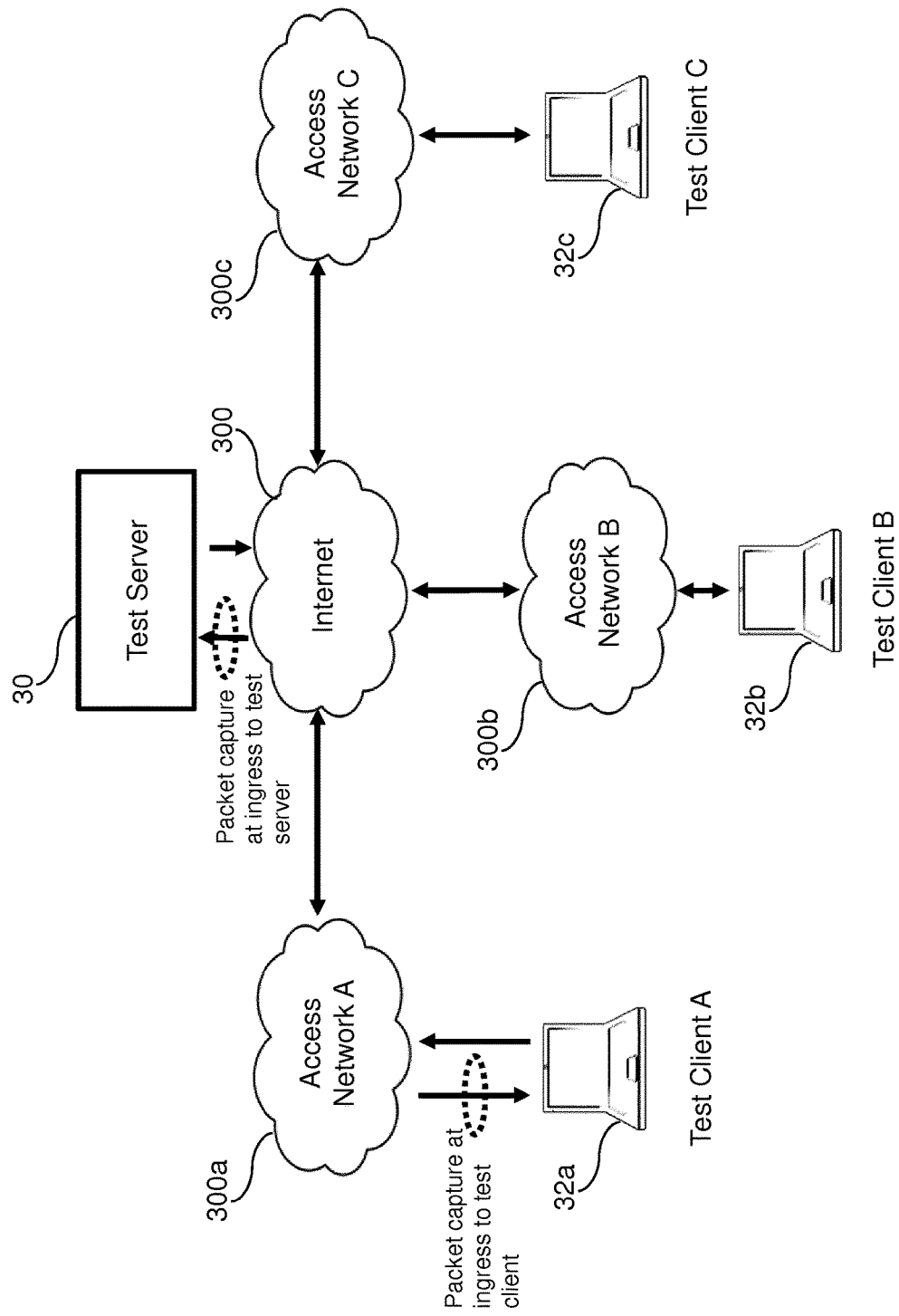
Figure 3: Schematic of Data Capture and Profile Creation phase

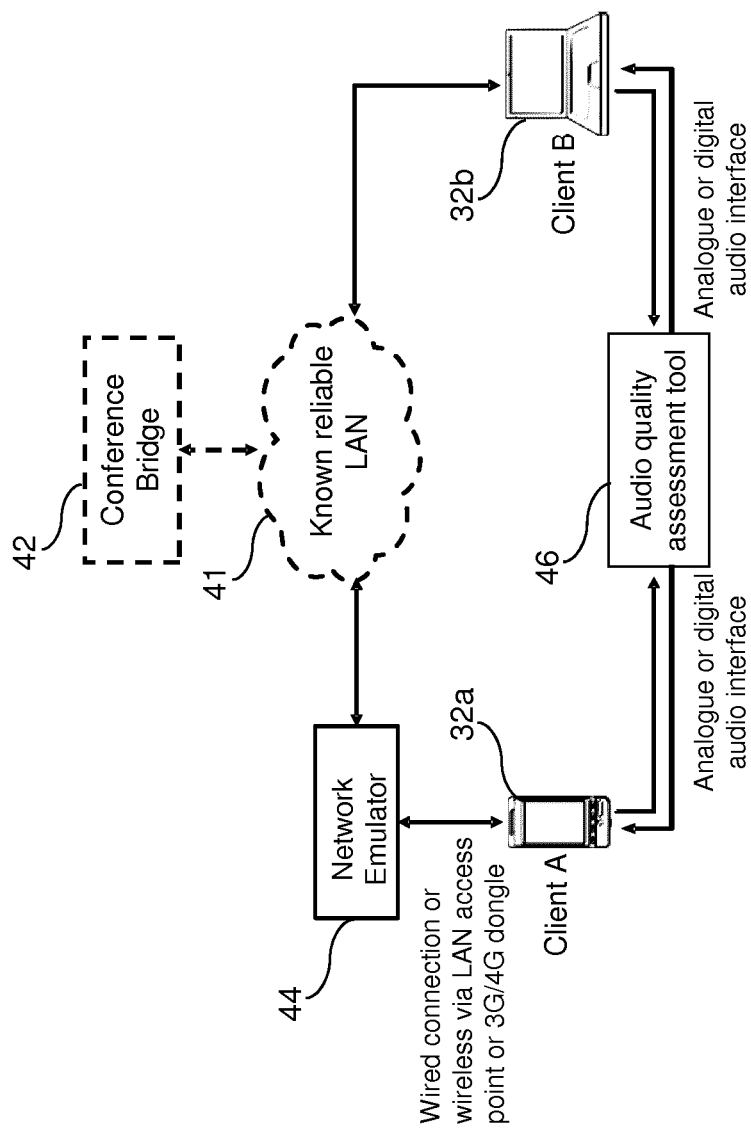
Figure 4: Schematic of Codec Testing phase

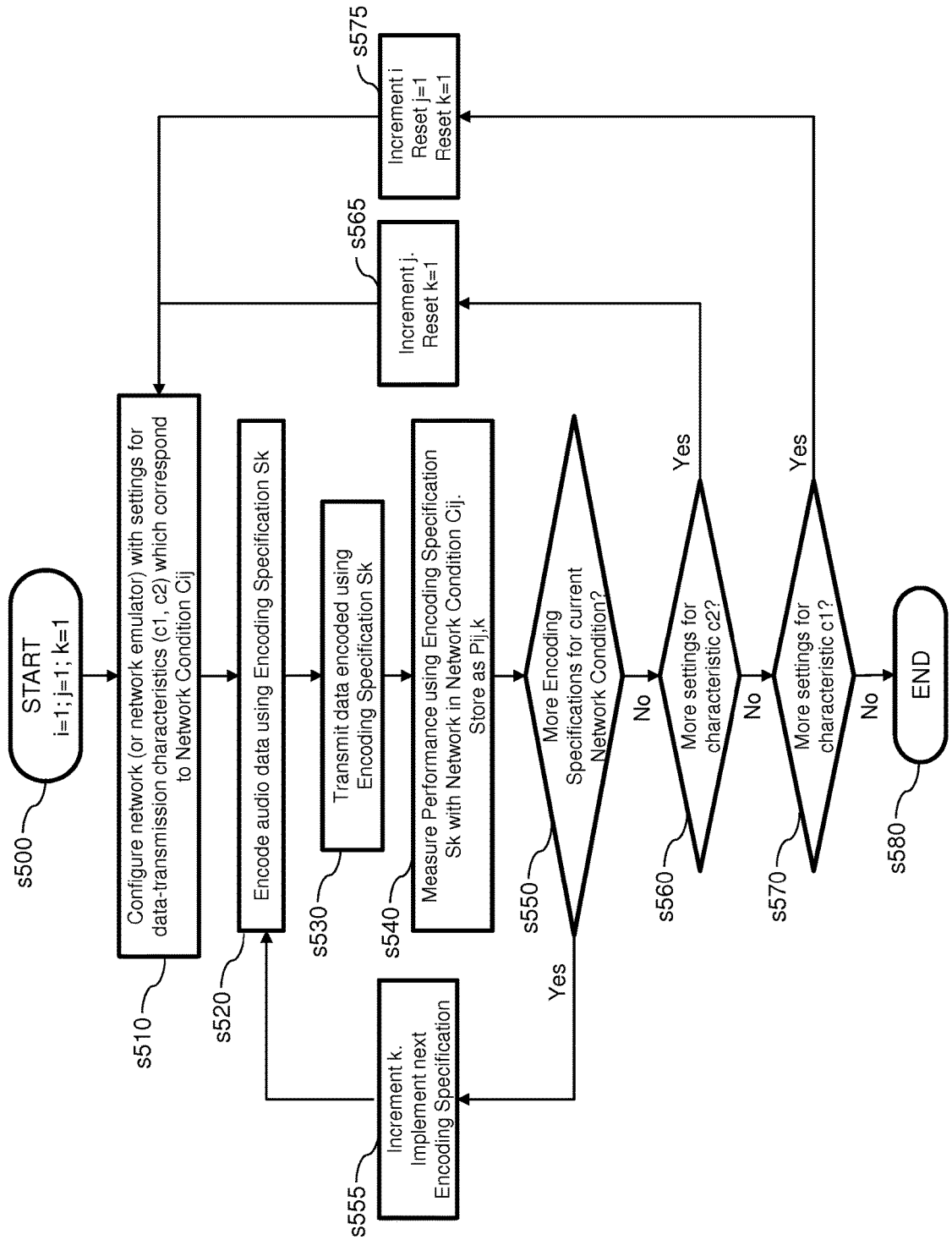
Figure 5: Example of Learning Phase - Version with configurable network condition

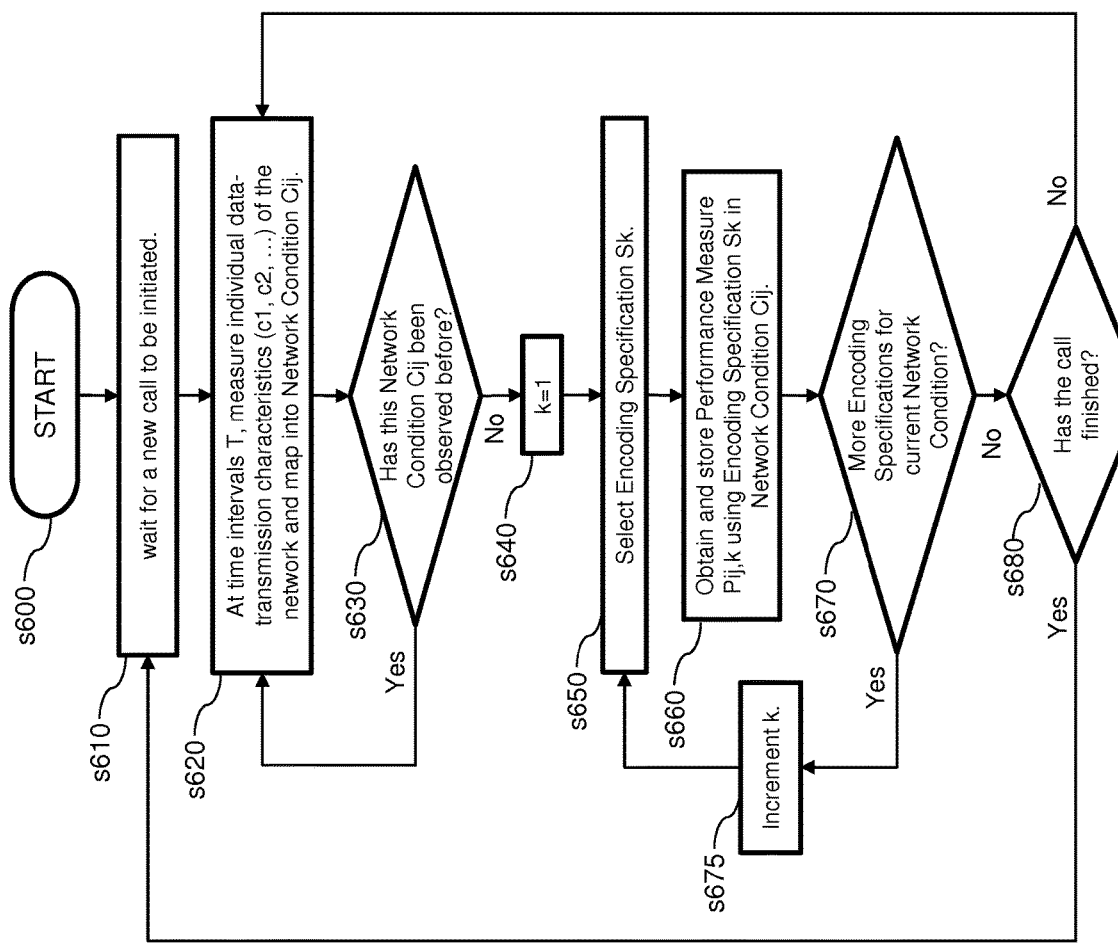
Figure 6: Example of Learning Phase - Version which waits for changes in network condition

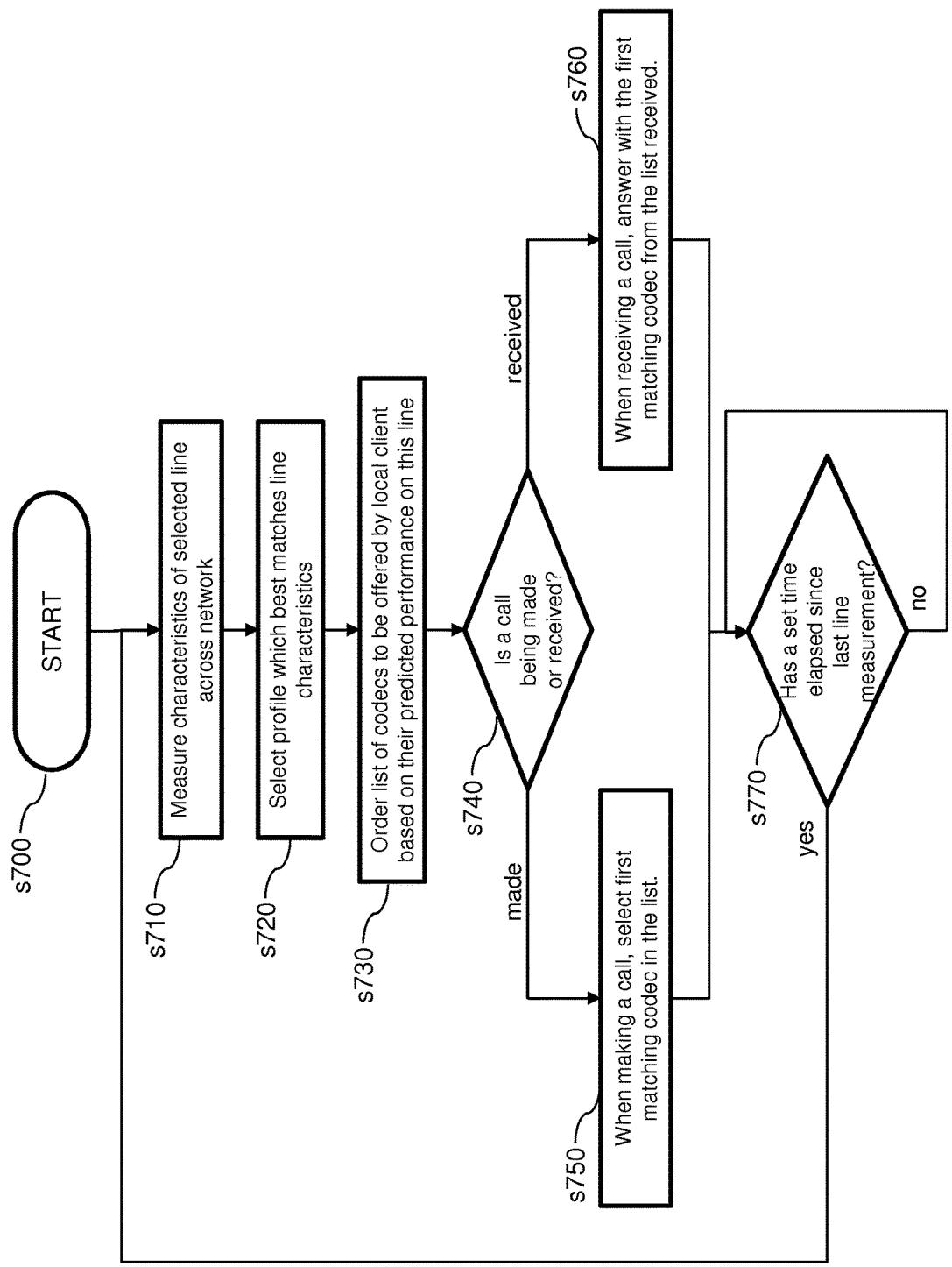
Figure 7: Example of optimised codec selection

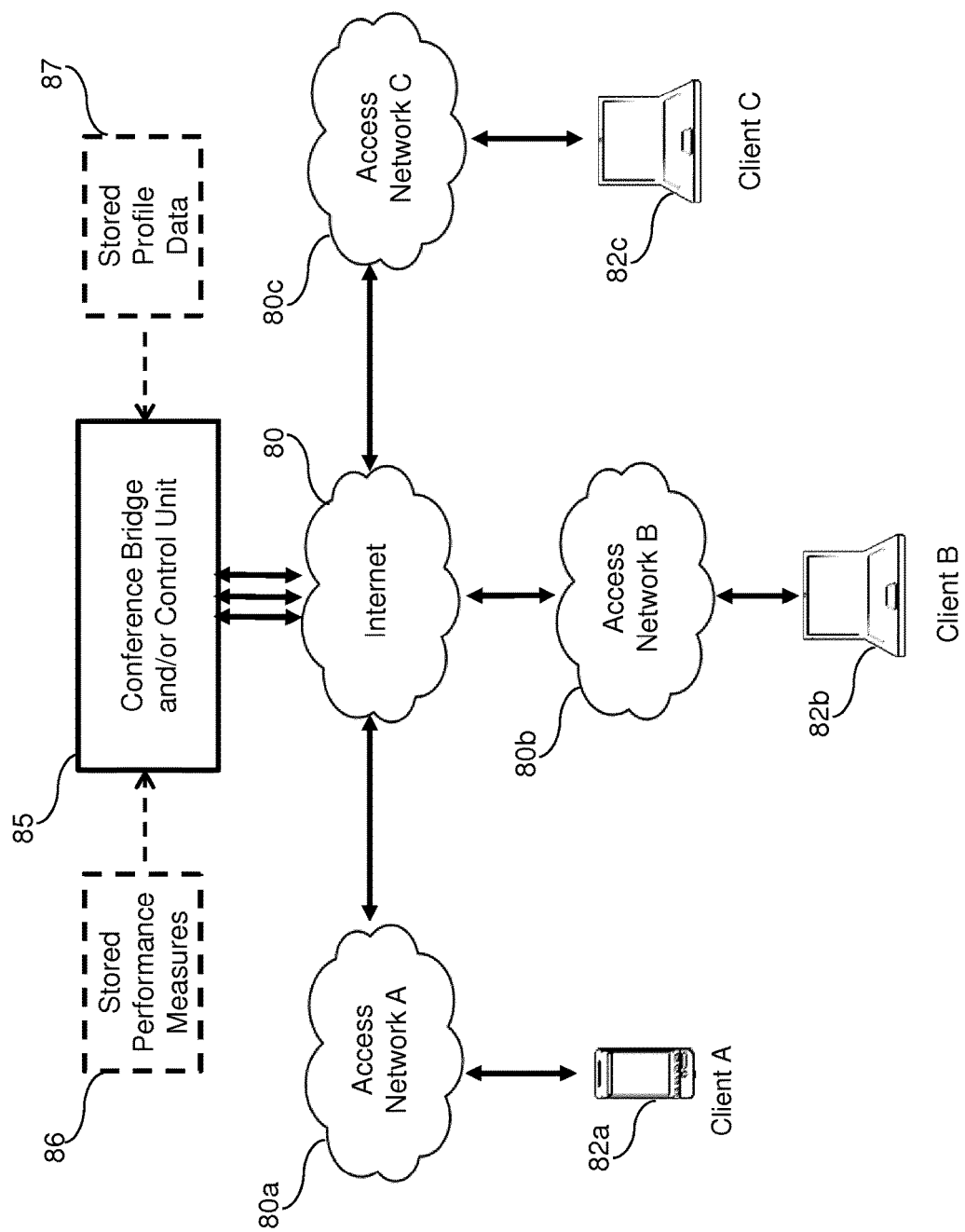
Figure 8: Entities Involved in Communication Session via Conference Bridge

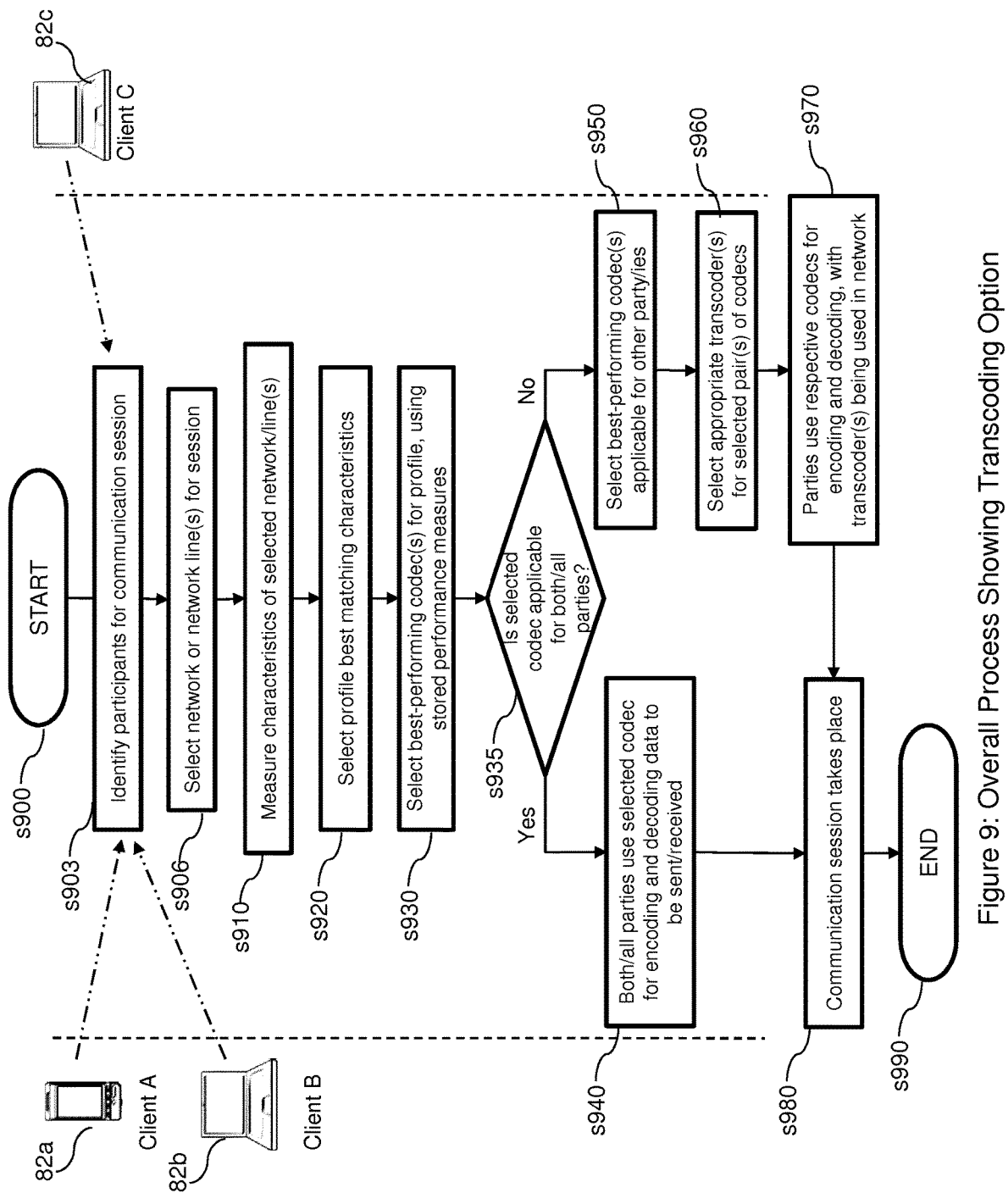
Figure 9: Overall Process Showing Transcoding Option

METHODS AND APPARATUS FOR THE ENCODING OF AUDIO AND/OR VIDEO DATA

This application is the U.S. national phase of International Application No. PCT/EP2018/071996 filed Aug. 14, 2018 which designated the U.S. and claims priority to EP Application No. 17186200.6 filed Aug. 14, 2017, the entire contents of each of which are hereby incorporated by reference.

TECHNICAL FIELD

The present invention relates to methods and apparatus for the encoding of audio and/or video data, and in particular to methods and apparatus for selecting an encoding specification for encoding audio and/or video data to be streamed from a sender to a receiver via a network.

BACKGROUND

Voice-over-Internet Protocol (usually referred to as "Voice over IP", "VoIP" or "IP telephony") relates to the delivery of voice and other audio communications (and also to multimedia sessions including an audio component) over Internet Protocol (IP) networks such as the Internet, rather than being provided simply via a public switched telephone network (PSTN).

While some of the steps and concepts involved in relation to VoIP sessions are generally similar to traditional digital telephony and involve signalling, channel set-up, digitisation of analogue voice signals, and encoding, with VoIP sessions, instead of the digital signals being transmitted over a circuit-switched network such as the PSTN, the digital information is instead packetised, and the transmission then involves IP packets being transmitted over a packet-switched network such as the Internet. The IP packets effectively transport audio streams using media delivery protocols that encode audio data (and video data, where applicable) with audio codecs (and/or video codecs, where applicable), an audio (and/or video) codec being a device or computer program for encoding and/or decoding a digital stream of audio (and/or video) data. Various codecs exist that optimise the media stream based on issues such as application requirements and network bandwidth. Some rely on narrowband and compressed speech, while others may support high fidelity stereo codecs.

VoIP plays a significant and increasing role in audio (and multimedia) communication services provided by Internet and Telecommunications Service Providers to their customers. Many VoIP services are supplied over private networks, whose parameters can be carefully controlled to ensure that call quality is maintained in line with expected demand. Nowadays, however, many VoIP services involve providing access over the Internet, enabling customers to use publicly-available networks or low-cost broadband connections.

Within an access network, VoIP can be prioritised using Quality-of-Service (QoS) techniques where contention from other services may be likely to impact call quality. However, the inherent flexibility of VoIP services, especially if accessed using softphones (i.e. software-based applications for making telephone calls over IP networks from a computer rather than from dedicated telephone hardware) on mobile devices, means that many calls are carried entirely "Over The Top" (OTT) (i.e. via the Internet without an operator controlling or distributing the content) or may not be prioritised for some parts of their end-to-end journey.

VoIP systems and audio technologies are often characterised by their performance in the presence of particular values of packet loss and jitter. Service providers use this information when designing and operating services to attempt to ensure that network impairments never exceed levels which are likely to result in a perceptible reduction in call quality.

End-to-end network performance is dependent on many factors, however, such as device hardware and configuration, operating environment, time of day and the availability of QoS or other loss mitigation techniques. As a result, it is often difficult to predict the real impact of a particular technology based on statistical averages and purely lab-based testing.

A range of commercial VoIP monitoring tools are used by service providers. A technique known as "PacketSmart" provided by Broadsoft allows detailed inspection of traffic statistics for individual voice calls, using a physical test device (i.e. a probe) at the client side. The technique does not allow the bulk export of call data, so each call needs to be viewed manually for each probe. Other VoIP monitoring tools provided by VisualWare and Empirix can also be used to capture data from VoIP calls in a more flexible way. These tools may be useful for diagnosing service issues, but do not provide insight into how different technology choices would affect their measurements.

The "SamKnows" technique provides performance benchmarks for broadband access networks worldwide, using dedicated probes in the premises of a large sample of customers. This makes measurements from standalone probes and local area network (LAN) gateway devices, using the RTP Control Protocol (RTCP) to measure average packet loss, jitter and round-trip delay over short bursts, and can provide evidence of VoIP performance for very short calls, but cannot predict the impact of different technology choices. (NB "RTP" refers to the "Real-time Transport Protocol", of which the RTCP is a sister protocol.

ITU Recommendation G.1050 provides a network model for evaluating multimedia transmission performance over the Internet. It works by creating interfering traffic streams and combining these with a test stream in a simulated model of a network switch. Interfering traffic streams derived from empirical data are combined in a series of impairment profiles. The model can either be run using a discrete event software simulator, or on some real-time hardware-based network emulators. Because G.1050 uses a library of empirical data for interfering traffic, its users must rely on this providing an adequate approximation of their own network environment.

United States application U.S. Pat. No. 7,768,998 (Everson et al) entitled "Dynamic VoIP codec selection based on link attributes at call setup", describes a method of selecting voice codecs for a VoIP call which is based on a proxy server testing the quality of the network connection between itself and each of two clients.

US20130156119 (Poulin), entitled "Methods, systems, and computer readable media for selecting a codec pair based on network conditions" discloses a method and a system for selecting a codec pair for two nodes trying to communicate through a digital communication network. Codec selection is achieved by obtaining two performance metrics for the two nodes and then these metrics are used to generate or update a codec selection model. A module measures performance metrics which can take into consideration factors such as packet loss, end-to-end delay and jitter and can be configured to obtain these metrics using an external probe that communicates with the communicating nodes or by using standardised protocols such as RTCP-XR. The codec selection model can be based on available bandwidth, routing cost, or voice quality estimations using the E-model.

A paper entitled: "Subjective VoIP speech quality evaluation based on network measurements" by Lakaniemi, A., Rosti, J. & Raisanen, V. I., *IEEE International Conference on Communications* (ICC2001), Vol. 3, pp. 748-752, available online at: http://ieeexplore.ieee.org/stamp/stamp.isp?arnumber=937339, discloses a method for measuring the quality of VoIP services using reliable subjective speech quality testing for simulated traffic streams that represent domestic (middle range) and international (long range) connections.

US20150200826 (Assem et al), entitled "Optimizing the quality of audio within a teleconferencing session via an adaptive codec switching" relates to the field of VoIP telephony and in particular to optimizing the quality of audio within a teleconferencing session via an adaptive codec switching.

Today, a wide range of audio codecs are implemented within VoIP services, and state-of-the-art codecs and associated technologies offer significant improvements in audio quality even at very low bitrates, coupled with increased resilience to packet loss and jitter. Furthermore, telecommunications providers are developing converged IP networks which integrate fixed and mobile voice services and could take advantage of state-of-the-art codec features. However, providing support for such codecs and interoperability between them is often costly in several ways, such as the following:

Transcoding resources may need to be provided in the network to allow calls to originate and terminate with different codecs. (NB Transcoding is the direct, generally digital-to-digital conversion of data encoded or compressed using one encoder (or encoded/compressed using one encoding specification of an encoder) into encoded or compressed data that can be decoded by a non-compatible, non-associated or otherwise different decoder (or data that can be decoded using a non-compatible, non-associated or otherwise different decoding specification of an decoder. Transcoding is often required where the codec used by one participant in a streamed communication session is not the same as the codec used by another participant in the communication session.)

The processing requirements of state-of-the-art codecs are often greater for client devices.

Some codecs require license fees to be paid.

Assuring VoIP performance in the presence of network impairments is an important challenge for providers implementing converged VoIP services. However, very limited information is usually available to help them to make the best choices for their particular network environment. This is because testing carried out on VoIP services usually only produces average statistics for impairments such as packet loss and jitter over very short durations. Furthermore, audio codec performance has traditionally been benchmarked using varying levels of random packet loss, which is very unlikely to represent the true behaviour of networks actually being used to carry VoIP streams.

SUMMARY OF THE INVENTION

According to a first aspect of the invention, there is provided a method of selecting an encoding specification for encoding audio and/or video data to be streamed from a sender to a receiver via a network, the method comprising:

in respect of a monitored network in each of a plurality of monitored network conditions, respective monitored network conditions being characterised by different combinations of data-transmission characteristics of at least two different types, obtaining a performance measure in respect of each of a plurality of different encoding specifications, the performance measure in respect of the monitored network when in a particular monitored network condition and in respect of a particular encoding specification being obtained by applying a predetermined performance measuring process in respect of audio and/or video data encoded using said encoding specification and streamed via the monitored network when in said monitored network condition;

in respect of a network over which audio and/or video data is subsequently to be streamed from a sender to a receiver, obtaining data-transmission characteristics of said at least two different types in respect of said network and selecting a corresponding one of said monitored network conditions in dependence on the data-transmission characteristics of said at least two different types obtained in respect of said network over which said data is to be streamed and on the combination of data-transmission characteristics of said at least two different types which characterised the monitored network when in said corresponding monitored network condition; and selecting an encoding specification for encoding said data to be streamed, the selection of said encoding specification being made in dependence on the performance measures obtained using said plurality of encoding specifications in respect of said monitored network when in said selected corresponding monitored network condition.

Embodiments of the invention are of use in relation to two-party VoIP sessions as well as to multi-party VoIP audio-conferences and other scenarios. In general, however, the selection of an appropriate encoding specification may involve (a) individually selecting an encoding specification for each participant (for use in relation to that participant's communications with a bridge or other such conference hub entity, and which should therefore be based primarily on the network between that participant and the bridge or other such conference hub entity); (b) selecting an encoding specification for the audio-conference session as a whole (which could be used in relation to each participant's communications with the bridge or other such conference hub entity, so should therefore be based primarily on the network including the links to each participant). The different encoding specifications may be selected independently, each selection being based on one of the networks or network links involved, or a "best-match" encoding specification may be selected taking account of more than one of the different networks or network links involved, for example.

Embodiments of the invention are of use in particular in relation to two-way communication sessions, but may also be used for the selection of an appropriate encoding specification for a one-way communication session. In such cases, the selection of an appropriate encoding specification may involve selecting an encoding specification for a "sending" party according to the above method, and may also involve selecting a decoding specification for a "receiving" party, the selection of a decoding specification for the "receiving" party being dependent primarily or even completely on the selection of the encoder specification made for the "sending" party. The same "codec" may be selected for each where applicable.

In general, the choice of what decoding specification to use for each/any party that is going to be a "receiving" party will be dependent at least primarily on the encoding specification chosen for the "sending" party, in that it would ideally be the decoder-part of the codec specification chosen for the "sending" party to use for its encoding. It may need to be different to that chosen for the "sending" party, if for example the "receiving" party is unable to use the decoder-part of the same codec (for compatibility reasons or otherwise), or because a different codec is more appropriate for the "receiving" party on account of it also being a "sending" party whose own encoding considerations over-ride its decoding considerations. If it needs to be different, it may be appropriate to take a separate "encoding specification" decision for each party, then to choose an appropriate transcoder (if necessary) in dependence on the respective encoding specifications.

According to preferred embodiments, the combinations of data-transmission characteristics by which a network condition is characterised may include one or more characteristics selected from the following:
  characteristics associated with communication speed;
  characteristics associated with communication delay and/or delay variation;
  characteristics associated with reliability;
  characteristics associated with data loss (e.g. "bursty packet loss");
  characteristics associated with communications quality.

According to preferred embodiments, the network over which audio and/or video data is subsequently to be streamed may be the network monitored in the step of obtaining performance measures. Alternatively, a separate, possibly dedicated test-network may be used, which may be a network configurable to emulate a variety of different network conditions having a variety of different combinations of data-transmission characteristics.

According to preferred embodiments, the method may further comprise selecting a decoding specification for decoding audio and/or video data that has been streamed from the sender towards the receiver via the network. In such embodiments, the decoding specification may be selected in dependence on the encoding specification selected for encoding said audio and/or video data to be streamed from the sender to the receiver via the network.

According to preferred embodiments, the performance measures obtained in respect of the monitored network in respect of a particular encoding specification may be obtained by applying a selected one of a plurality of predetermined performance measuring processes, the performance measuring process to be applied in respect of a particular encoding specification being selected in dependence on the encoding specification. This allows an appropriate performance measuring process to be chosen for an encoding specification which discriminates usefully between the different performances obtained when using the encoding specification in question when the monitored network is in different network conditions.

According to preferred embodiments, the method may further comprise selecting an encoding specification for encoding audio and/or video data to be streamed from said receiver to said sender via the network, the encoding specification for encoding audio and/or video data to be streamed from said receiver to said sender being selected independently of the encoding specification selected for encoding audio and/or video data to be streamed from the sender to the receiver. In such embodiments, the method may further comprise selecting a transcoding specification in the event that the encoding specification selected for encoding audio and/or video data to be streamed from said receiver to said sender differs from and/or is incompatible with the encoding specification selected for encoding audio and/or video data to be streamed from the sender to the receiver. Where a transcoding specification is selected, it may be selected in dependence on the respective encoding specifications selected.

According to a second aspect of the invention, there is provided a method of encoding audio and/or video data to be streamed from a sender to a receiver via a network, the method comprising selecting an encoding specification for encoding audio and/or video data according to the first aspect, and encoding said data using said selected encoding specification.

According to a third aspect of the invention, there is provided a method of streaming audio and/or video data from a sender to a receiver via a network, the method comprising selecting an encoding specification for encoding audio and/or video data according to the first aspect, encoding said data using said selected encoding specification, and streaming the encoded data from said sender to said receiver via said network.

According to a fourth aspect of the invention, there is provided a method of selecting one or more encoding specifications for encoding audio and/or video data to be streamed between participants in a multi-party communication session, the communication session involving audio and/or video data being streamed via at least one network and via a communication session control unit, the method comprising selecting an encoding specification according to said first aspect for encoding audio and/or video data to be streamed from one or more of said participants to said communication session control unit via a network.

According to preferred embodiments, the method may further comprise selecting one or more other encoding specifications for encoding audio and/or video data to be streamed from one or more others of said participants to said communication session control unit via a network, the selection of said one or more other encoding specifications being at least partly dependent on the selection of the first encoding specification.

According to a fifth aspect of the invention, there is provided apparatus for performing methods according to any of the above aspects.

According to a sixth aspect of the invention, there is provided a computer program element comprising computer program code to, when loaded into a computer system and executed thereon, cause the computer to perform the steps of a method according to any of the above aspects.

The various options and preferred embodiments referred to above in relation to the first aspect are also applicable in relation to the other aspects.

Preferred embodiments of the invention involve methods and apparatus for optimising the use of audio coding and transcoding resources within a Voice-over-IP service.

Preferred embodiments of the invention use IP packet data captured during test VoIP calls carried out across a particular network to build a model of VoIP performance with specific reference to bursty packet loss and jitter, which represents the true behaviour of that network. Such embodiments are then able to use that model to derive an objective measurement of VoIP call quality for a range of audio codecs across a wide range of network impairments observed (from burstfree loss to heavily bursty loss). This model may then be used to optimise the selection of codecs for specific voice services. This optimisation can be carried out as a one-off process which determines how VoIP clients and call servers are configured—for example, it could prescribe the use of a resilient state-of-the-art codec for customers whose access network connection frequently exhibits bursty packet loss. It can also be implemented as a dynamic process integrated within the call server, such that codecs and transcoding paths are selected on a per-call basis—for example, to make optimal use of a limited pool of transcoding resources for a high-complexity codec.

In addition to considering audio codecs alone, preferred embodiments can, where appropriate, also include combinations of codecs and external functions such as packet loss concealment algorithms.

An advantage of preferred embodiments may stem from use of burst and jitter modelling to predict how different codecs or encoding specifications will perform in varying conditions on a specific network. These predictions are then applied to determine which codecs and settings should be used to optimise cost and quality of experience for VoIP calls made across that network. Currently, a VoIP service provider cannot realistically answer the question "What will be the impact of deploying codec X in my network, and for which customers would it be most beneficial?" without considerable manual effort. Furthermore, without a model which can be used to dynamically choose the codec configuration for each customer, the service provider cannot optimise their use of codecs and transcoding resources efficiently: they are restricted to one-off updates to policy based on aggregated data.

BRIEF DESCRIPTION OF THE DRAWINGS

Preferred embodiments of the invention will now be described with reference to the appended drawings, in which:

FIG. 1 is a block diagram of a computer system suitable for the operation of preferred embodiments of the invention;

FIG. 2 shows in schematic form possible phases of a process according to preferred embodiments;

FIG. 3 shows an arrangement of components that may be involved in Data Capture and Profile Creation phases according to preferred embodiments;

FIG. 4 shows an arrangement of components that may be involved in a Codec Testing phase according to preferred embodiments;

FIG. 5 illustrates an example of a learning phase technique which may be performed using a network whose network condition may be configured;

FIG. 6 illustrates an alternative learning phase technique which may be performed using a network whose network condition may vary;

FIG. 7 shows an example of how an encoding specification may be selected using data obtained during a learning phase according to preferred embodiments;

FIG. 8 shows entities which may be involved in a communication session according to preferred embodiments where the session takes place via a conference bridge; and FIG. 9 shows an example of how encoding specifications and transcoding resources may be selected using data obtained in a learning phase according to a preferred embodiment.

DESCRIPTION OF PREFERRED EMBODIMENTS OF THE INVENTION

With reference to the accompanying figures, methods and apparatus according to preferred embodiments will be described.

FIG. 1 is a block diagram of a computer system suitable for the operation of embodiments of the invention. A central processor unit (CPU) 102 is communicatively connected to a data store 104 and an input/output (I/O) interface 106 via a data bus 108. The data store 104 can be any read/write storage device or combination of devices such as a random access memory (RAM) or a non-volatile storage device, and can be used for storing executable and/or non-executable data. Examples of non-volatile storage devices include disk or tape storage devices. The I/O interface 106 is an interface to devices for input or output of data, or for both input and output of data. Examples of I/O devices connectable to I/O interface 106 include a keyboard, a mouse, a display (such as a monitor) and a network connection.

Methods according to preferred embodiments may be regarded as involving a number of phases, although it will be appreciated that the respective processes involved may be performed on an ongoing and/or iterative basis, meaning that the different processes may be performed at the same time as each other, or at overlapping times, rather than in strictly sequential phases. At a high level, they may be regarded as having a "learning" phase and a "live" phase, but using a more detailed characterisation of methods according to preferred embodiments, the overall method may be regarded as involving four phases, namely a Data Capture phase (in which information is obtained about a monitored network, thereby allowing a range of possible network conditions to be characterised with reference to various data-transmission characteristics), a Profile Creation phase (in which the information obtained about the monitored network is used to define a number of Profiles each indicative of a possible network condition or sub-range of network conditions), a Codec Testing phase (in which performance measures are obtained in respect of the network when in each of a number of possible network conditions, using data encoded using each of a number of different codecs or codec settings (both of which may be referred to as "encoding specifications"), and a VoIP Service Optimisation phase (in which an encoding specification is selected for use when streaming data in an actual, live, real-time communication session).

The respective processes/phases according to this more detailed characterisation are illustrated schematically by way of example in FIG. 2, which characterises methods according to preferred embodiments as having the following:

a Data Capture phase 21;
a Profile Creation phase 23;
a Codec Testing phase 25; and
a VoIP Service Optimisation phase 27.

In such preferred embodiments, the Data Capture and Profile Creation phases 21, 23 are concerned with the task of capturing call data. As will later be explained, this may be done using representative and well-described real-world environments on the service provider's network (including both access network and client configuration), or may be done using a dedicated test network which may be configured such as to mimic a number of different conditions in which the service provider's actual network may be found. The call data may then be pre-processed, analysed and aggregated to generate a profile of packet characteristics over time for different classes of real-world environment.

The "data capturing" task performed in the Data Capture phase 21 may involve capturing data from different access network environments at different times. This could be achieved in a number of different ways and using a variety of different existing systems and tools, including a dedicated probe-based solution. In one implementation, a small population of probes may be used to capture an initial tranche of detailed packet data and create an initial set of profiles. A much larger and representative population of devices with a more basic data capture capability could then be used to validate and refine the initial set of "network condition" profiles for the Profile Creation phase 23, which involves using the captured data to create a limited number of unique Network Conditions, each one characterised by a different combination of data-transmission characteristics.

VoIP systems and audio technologies are often characterised by their performance in the presence of variety of different transmission characteristics such as packet loss, delay, jitter, communication speed, reliability, communications quality, etc. Such characteristics are usually complex and multifaceted. For example, different aspect of packet loss such as loss rate, discard rate, nature of loss (bursty or random), length and density of loss bursts all have a varying effect on the quality of a VoIP service. Delay itself can be categorised into two main types: network delay (i.e. round trip delay) and end-system delay. Jitter values are generally defined depending on the type and length of the system jitter buffer. Using an adaptive jitter buffer for example may mean the system will produce a variable delay figure, whereas the length of the jitter buffer generally dictates the maximum delay that can occur.

Combinations of data-transmission characteristics such as the above, or others, may be chosen to characterise the respective Network Conditions.

Existing probes (e.g. those used in the "PacketSmart" and "SamKnows" techniques discussed earlier) could be used to support such profile creation.

The Codec Testing phase 25 is concerned with evaluating the performance of a selected audio codec technology or codec setting, implemented within a VoIP system, under profiles corresponding to different network conditions. This may be achieved by connecting the system under test over a network emulator which can 'play back' the precise packet characteristics over time which are specified by one or more profiles generated in the Profile Creation phase 23. Using this, objective performance measurements may be obtained when data encoded using a number of different Encoding Specifications is transmitted over the network when in each of a number of the respective Network Conditions.

Performance can be evaluated using an automated speech quality assessment methodology such as ITU P.862 (PESQ) or ITU P.863 (POLQA), for example. More information about these is provided later. A suitable voice quality assessment tool is the Malden MultiDSLA tool, which implements both PESQ and POLQA and can be configured to carry out long-duration automated tests between two VoIP clients.

During the VoIP Service Optimisation phase 27, the codec performance data and network performance profiles may be used together to determine the optimal use of codecs (and transcoding resources, where necessary) within an operational VoIP service carried over the service provider's network.

As explained previously, this phase may be run as a one-off process to determine how VoIP clients and call servers are configured, hence creating a specific service configuration. In an alternative implementation, it may be integrated with a VoIP call server, essentially providing a dynamic policy function to enable codecs and transcoding paths to be selected on a per-call basis.

Overview of the Data Capture and Profile Creation Phases

FIG. 3 shows the arrangement of components that may be involved in the Data Capture and Profile Creation phases according to preferred embodiments. A test server 30 is set up with a high-speed and uncongested connection to the Internet 300. A number of test clients or probes (in this example, Test Client A, 32*a*, Test Client B, 32*b*, and Test Client C, 32*c*), are then set up on specific access networks (in this example, Access Network A, 300*a*, Access Network B, 300*b*, and Access Network C, 300*c*), which may have different network configurations or properties. The test clients or probes 32 may have wired or wireless connections to the respective access networks via a LAN access point or a 3G/4G dongle, for example.

At a specified time of day, or when otherwise required or triggered, at least one of the test clients or probes 32 makes a VoIP call to the test server 30 via its access network and the Internet 300 using a specific configuration (including codec and bitrate) for a specific duration. For the duration of the call, a representative speech recording is played out simultaneously on both test client 32 and test server 30. Also, packet data is captured at both test client 32 and test server 30 during each call.

Design issues taken into account for this phase may include the following:

1) A purpose of the profile creation phase may be to sample the end-to-end connection between a test client or probe 32 and the test server 30, preferably over a long duration. Audio impairments, when transmitted using a VoIP system, may be affected in different ways depending on the bitrates and packet times it uses. Therefore, test calls are generally made using constant-bitrate codecs at different bitrates and packet times, so that appropriate matching profiles can be chosen for use during the Codec Testing phase.

2) It is preferable for the test clients or probes 32 to be suitable for use on actual broadband lines, so the probe software that sends signals and initiates VoIP calls should generally be able to traverse Network Address Translation (NAT) devices and firewalls in order to connect to the test server. While some traffic generation tools may be unable to do this, various softphone implementations (e.g. "Linphone", a widely-used open-source softphone, details about which are available at http://www.linphone.org/) are suitable. Preferably a softphone offering good support for different codec plugins and automation is used.

3) It is preferable for the data used for profile creation to be based on real impairments in the network path between the test client or probe 32 and the test server 30. For this reason, the packet streams in both directions are preferably captured at both test client/probe 32 and at test server 30, as this can be used to ensure that (a) any firewall traversal process has correctly formed a direct connection between the two (and that the stream is not being relayed via an intermediate server) and (b) that the packet streams leaving each endpoint are well-formed and at equal intervals.

4) It is well-known that VoIP clients and individual audio codecs can employ jitter buffer management and packet loss concealment techniques to reduce the effect of network impairments on voice quality. By capturing packet streams as they leave the transmitting client and as they arrive at the receiving client, all network impairments can be sampled before any concealment techniques are applied.

Obtaining Profiles from Captured Data

Once a test call is completed, it can be processed and analysed to extract information about the call (e.g. packet loss, jitter, bitrate, call duration, etc.) which will support the creation of a profile, representing a particular network condition. In the present example, each call may have two packet capture (PCAP) files and two log files associated with it, one of each at the server and one of each at the client. Log files are created whenever a probe attempts to initiate a test call with the server. If a test call is established, then the log file will contain some further information about the call. The client log file may also contain information about its configuration (IP address, port number, etc.). PCAP files may also be generated when actual test calls are established. Both server and client PCAP and log files may be used to determine the packet-level performance profile for the corresponding access network configuration.

At regular intervals (e.g. daily), all deployed probes may be configured to upload to a server all the PCAP files and log files that have been created by the probe during that day. Once aggregated on the server, these PCAP files can be processed in the following steps:

1) Parsing and filtering the packet captures;
2) Analysing the filtered captures;
3) Aggregating the results from successive captures.

In Stage 1, two RTP streams are filtered from each PCAP file (one sent and one received). Source and destination IP addresses and port numbers used in the filtering would generally already be fixed and known for the server whereas the client log files may be used to extract those for each probe. It is worth noting that the server-sent and client-received RTP streams represent the downstream part of the call, whereas the client-sent and server-received RTP streams represent the upstream part of the call.

Once the RTP streams are filtered, downstream and upstream data can be analysed separately. Each packet in an RTP stream will have a sequence number. The sequence for an RTP stream starts with a random integer and increments by one for each RTP data packet, and hence it is used as a unique packet identifier for comparison between sent and received PCAPs. In the present example, a primary objective of analysing the PCAP files may be to identify the status and jitter value for each and every packet in the streams, but it will be appreciated that other characteristics may be monitored. If a sent packet is received at the other end, then its status may be marked down as 'received' and it may be given the number +1. If the packet is not found in the received stream, then it may be marked as 'lost' and may be given the number 0. In some cases, packets might be delayed and might arrive after several consecutive packets have been received. In this case, the packet status may be marked down as 'delayed' and given the number −1. For each received and delayed packet, the jitter value may be calculated. This may be done using the IP packet delay variation (IPDV) specification, for example. This is detailed in RFC 3393 ("IP packet delay variation metric for IP performance metrics (IPPM)" by Demichelis, C. and Chimento, P., 2002).

This data can be used to calculate some general statistics such as the average packet loss rate and jitter values over the whole period of the call. Other information may also usefully be measured, such as RTP packetisation intervals (p-times), bitrate, actual call durations, number of sent and received packets, and codec type.

The data may then be used to characterise packet loss and discard burstiness, for example, for one or more lines, which might represent a particular access technology or other set of line characteristics which may be of interest. As explained earlier, the modelling of bursty packet loss is useful, as bursty packet loss is one of a number of useful characteristics by which network condition can be characterised.

Data for different calls from a single line or multiple lines may be aggregated then split into small streams of VoIP data in, which may be in the range of a few seconds (8 to 12 seconds, for example). The burstiness in these short streams may then be measured and analysed.

Burstiness characterisation techniques can be applied for VoIP streams of any length, yet having short streams (in the order of 8 to 12 seconds) makes them easier to study, analyse, and objectively test the effect of burstiness on their voice quality.

Different models of burstiness can be used, such as measuring the Burst Ratio (BurstR) (see, for example, U.S. Pat. No. 6,931,017, McGowan, J. W., Lucent Technologies Inc., 2005. "Burst ratio: a measure of bursty loss on packet-based networks") or using data from RTP Control Protocol (RTCP XR) Extended Reports as detailed in RFC3611 ("Measurement Identity and Information Reporting Using a Source Description (SDES) Item and an RTCP Extended Report (XR) Block" by Clark, A., Measurement, 2012).

Overview of the Codec Testing or "Learning" Phase

Having partitioned a suitable range of possible conditions of the network being used for testing into a finite number of discrete network conditions, each characterised by different combinations of data-transmission characteristics (e.g. jitter and bursty packet loss, for example) (noting that the network being used for testing may in fact be the actual network over which actual, live communication sessions are subsequently to take place), the performance when using each of a number of different encoding specifications in respect of each of those different network conditions may then be tested. This may be done using a dedicated test network or network emulator for example, allowing different network conditions to be configured one after the other for testing purposes. Alternatively, this may be done using the actual network over which actual, live communication sessions are subsequently to take place, although this may limit the extent to which the network can be configured into particular network conditions, so while having the advantage of precisely reflecting network conditions that may be experienced when using the network for a communication session, it may inhibit or prevent the testing of each of the different encoding specifications in respect of each of the different network conditions, so may not allow for as complete a set of performance measures to be obtained as easily.

FIG. 4 shows an arrangement of components that may be involved in the Codec Testing phase according to preferred embodiments. Two test clients (Client A, 32a and Client B, 32b) are set up with appropriate software for the selected VoIP system to be evaluated. If a conferencing system is under test, a (preferably uncontended) conference bridge or other such conferencing server 42 is connected via a known reliable LAN 41 so a minimum number of additional network impairments are introduced by connecting to it. The conference bridge 42 and LAN 41 are shown in dotted lines because they are not required in the case of a simple point-to-point VoIP system. If it is a simple point-to-point VoIP system, clients A, 32a and B, 32b may be connected to each other via a Network Emulator 44 which can programmatically impose a pre-generated profile of impairments on a packet-by-packet basis over a long duration.

The two clients 32a, 32b are also connected to an audio quality assessment tool 46 (for example, the "Malden MultiDSLA" automated speech performance measurement system discussed earlier), and the playback of the impairment profile in the emulator may be synchronised with the running of an automated speech quality test between the two clients 32a, 32b. As shown in FIG. 4, different types of client device and access network configuration may be used depending on the matching impairment profile. In this example, Client A, 32a is a mobile phone and Client B, 32b is a computer running VoIP software.

Preferably, the network emulator 44 is able to play back a timed impairment profile accurately. Various dedicated commercially-available emulators are able to do this programmatically, but this is not essential. Alternatively, an emulator may be implemented on commodity computer hardware using external Ethernet LAN interfaces and a network simulator such as an open source ns-3 discrete-event network simulator.

Preferably, the characteristics of the VoIP system selected for evaluation will be clearly understood, and the system will be tested with an unimpaired connection (i.e. no packet loss or jitter) before an appropriate impairment profile is chosen and applied. In particular, it is useful to understand the amount of jitter which may be introduced by the client at source, as well as the bitrate variation if a variable bitrate codec is to be used. Furthermore, it may be appropriate to synchronise clocks between clients A and B for the duration of the test in order to prevent clock drift from causing packet loss which is not specified in the impairment profile.

It should be noted that such a process essentially tests the whole VoIP system, rather than just a codec in isolation. If a VoIP system provides packet loss concealment and/or jitter buffer management and these features are switched on, the test will measure the performance of the combination of these features with the audio codec.

ITU-recommended objective measurement techniques may be used in conjunction with the audio quality assessment tool 46 to carry out an automated speech quality assessment for VoIP streams with different network impairment characteristics. These techniques can be categorised as signal- (or reference-)based methods or parameter-based models. Two examples of the signal-based methods are "PESQ" (proposed in "Perceptual Evaluation of Speech Quality (PESQ): An Objective Method for End-to-End Speech Quality Assessment of Narrowband Telephone Networks and Speech Codecs" by Rix, A. W., Beerends, J. G., Hollier, M. P. and Hekstra, A. P in ITU-T Recommendation, 2001, p.862) and POLQA (proposed in "Perceptual Objective Listening Quality Assessment (POLQA): The Third Generation ITU-T Standard for End-to-End Speech Quality Measurement, Part I: Temporal Alignment" by Beerends, J. G., Schmidmer, C., Berger, J., Obermann, M., Ullmann, R., Pomy, J. and Keyhl, M., Journal of the Audio Engineering Society, 61(6), 2013, pp. 366-384). Both methods use perceptual models to predict speech quality. POLQA is considered the successor of PESQ. POLQA is more accurate and its capabilities are extended to higher bandwidth audio signals such as wideband (WB) and super-wideband (SWB). Parameter-based computational models are widely used to provide predictions of the expected voice quality for network transmission planning purposes. They rely on using mathematical methods to model and predict subjective tests results. Such models do not need true voice samples as test signals to carry out the voice quality measurement and hence the performance of VoIP codecs can be directly calculated under different network conditions. An example of such a model is the E-model, which is an ITU-T standardised voice quality testing system. Further information on this can be found from: Bergstra, J. A. & Middelburg, C. A., 2003.

ITU-T Recommendation G. 107: "The E-Model, a computational model for use in transmission planning".

Such methods may be used to study the effect of real-world network impairments (measured and characterised by the system presented here) on VoIP systems using legacy codecs such as G.711 and G.722. They may also be used to measure the gained benefit on voice quality when state-of-the-art codecs such as EVS and Opus, and when packet loss concealment (PLC) and forward error correction (FEC) techniques are used under such conditions. Perceptual models employed by methods such as PESQ and POLQA may be calibrated against specific codecs. Their behaviour when applied to state-of-the-art codecs may not be well-defined. While successive measurements of particular codec should be consistent, it may be appropriate to use alternative methods to cross-check objective tests to ensure that the performance of different codecs can be legitimately compared. Such alternative methods could include subjective listening tests in which recorded samples of speech passed through an impaired system are scored by human subjects. The same concept applies on parameter-based methods. The computational models employed by methods such as the E-model might only be suitable for measuring the performance of legacy codecs such as G.711 and hence need to be adapted and benchmarked against other methods to make sure they produce accurate measurements for state-of-the art codec such as EVS and Opus.

Referring now to FIG. 5 and FIG. 6, these illustrate two different manners in which the "Codec Testing" phase may be performed. The first of these (shown in FIG. 5) would generally be performed after "Data Capture" and "Profile Creation" phases have been performed, thus testing a number of codecs in relation to each of a number of already-defined Network Conditions, so would generally correspond to the final part of a "Learning" phase. The second of these (shown in FIG. 6) would generally not require a separate "Data Capture" and "Profile Creation" phase to be performed, as it would essentially replace them, defining a number Network Conditions while testing a number of codecs in relation to each one.

Referring to FIG. 5, this illustrates a learning phase technique which may be performed by an entity such as the audio quality assessment tool 46 shown in FIG. 4, using a dedicated test network or other such network whose network configuration can be varied in a controlled manner, using a network emulator, for example. For simplicity, this technique will be explained in relation to a scenario where Network Conditions $C_{ij}$ are characterised by two types of data transmission characteristic, c1 and c2, which may be characteristics such as bursty packet loss and jitter, for example. As explained earlier, other types of data transmission characteristics (and other types of characteristics) may be used to characterise Network Conditions, and more than two types of characteristics may be used.

Starting from step s500, counters i, j, and k are initialised such that i=1, j=1 and k=1.

At step s510, the network (or network emulator) is configured with counter values i=1 and j=1 being set in respect of the respective data-transmission characteristics c1 and c2, resulting in the network being (or simulated as being) in Network Condition $C_{11}$.

At step s520, audio data is encoded using a first codec or other such Encoding Specification $S_1$.

At step s530, data encoded using Encoding Specification $S_1$ is transmitted via the network while the network is in Network Condition $C_{11}$.

At step s540, the network performance using Encoding Specification $S_1$ with the network in Network Condition $C_{11}$ is measured, the resulting performance measure ($P_{ij,k}$ with i=1, j=1 and k=1) being stored as $P_{11,1}$.

If it is found at step s550 that there are more Encoding Specifications to be used with the network in its current Network Condition, the Encoding Specification value k is incremented, resulting in the next Encoding Specification being implemented (step s555), then the process returns to step s520, at which audio data is encoded using the next codec or other such Encoding Specification, then steps s530, s540 and s550 are repeated in order to obtain a performance measure in respect of the current Network Condition with the next Encoding Specification.

If it is found at step s550 that all of the Encoding Specifications have been used and tested with the network in its current Network Condition, the process proceeds to step s560, at which it is determined whether there are more settings for characteristic c2. If so, the process proceeds via step s565, at which value j (the counter for the second characteristic) is incremented, and Encoding Specification value k is reset back to 1. The process then returns to step s510 at which the network (or network emulator) is configured to be (or simulates the network as being) in the next Network Condition Cij, which in this instance will be Network Condition $C_{12}$. Steps s520, s530, s540, s550 and s555 are then performed in respect of each Encoding Specification in order to obtain performance measures $P_{12,k}$ in respect of each Encoding Specification with the network in the next Network Condition, and so on until performance measures $P_{1j,k}$ have been obtained in respect of each Encoding Specification $S_k$ with the network in each Network Condition $C_{1j}$.

When it is found at step s560 that there are no more settings for characteristic c2, the process proceeds to step s570, at which it is determined whether there are more settings for characteristic c1. If so, the process proceeds via step s575, at which value i (the counter for the first characteristic) is incremented. Value j (the counter for the second characteristic) and Encoding Specification value k are both reset back to 1. The process then returns to step s510 at which the network (or network emulator) is configured to be (or simulates the network as being) in the next Network Condition $C_{2j}$, which in this instance will be Network Condition $C_{21}$. Steps s520, s530, s540, s550, s555, s560, s565 are then repeated in respect of each Encoding Specification and each successive Network Condition in order to obtain performance measures $P_{2j,k}$, $P_{3j,k}$, etc., in respect of each Encoding Specification with the network in each successive Network Condition, and so on until performance measures $P_{ij,k}$ have been obtained in respect of each Encoding Specification $S_k$ with the network in each Network Condition Cij.

When it is found at step s570 that there are no more settings for characteristic c1, the learning phase may end (step s580). Alternatively, it may be repeated, or may run continuously in order to obtain a more complete set of performance measures for different Network Conditions and for different Encoding Specifications.

By this point, however, a complete i by j by k "matrix" will have been populated with performance measures $P_{ij,k}$, thus providing a performance measure in respect of each Encoding Specification with the network in each Network Condition. Such a matrix of performance measures may then be used for the selection of an encoding specification for encoding data to be streamed as part of an actual, live communication session over a network, in dependence on the condition of the network at that time. An exemplary process for this will be explained later with reference to FIG. 7.

Referring now to FIG. 6, this illustrates an alternative learning phase technique. This may be performed using a network whose network condition may vary in a manner not under the control of the person or entity performing the technique. It may be performed using an actual network over which live communication sessions are being streamed. It does not need to be performed over a dedicated test network or over another such network whose network condition can be varied in a controlled manner. It may thus be performed by monitoring and using the network over which actual calls are subsequently to be streamed, using encoding specifications selected using the information determined during the learning phase.

As with the technique of FIG. 5, for simplicity, this technique will be explained in relation to a scenario where Network Conditions Cij are characterised by two types of data transmission characteristic, c1 and c2 (such as bursty packet loss and jitter, for example). As before, other types of data transmission characteristics (and other types of characteristics) may be used to characterise Network Conditions, and more than two types of characteristics may be used.

Starting from step s600, the processing entity performing the process (which may be the audio quality assessment tool 46 shown in FIG. 4) waits for a new call to be initiated over the network being monitored.

Once such a call has been initiated, individual data-transmission characteristics (c1, c2 . . . ) of the network are measured (at time intervals T, for example), and these are mapped into a Network Condition Cij (step s620).

At step s630, a determination is made as to whether this particular Network Condition Cij (i.e. with characteristics c1, c2 . . . in their present states) been observed before. If so, the process returns to step s620. If not, the process proceeds to step s640, at which the Encoding Specification value k is set at k=1, and the process proceeds to step s650.

At step s650, Encoding Specification $S_1$ is selected.

At step s660, Performance Measure $P_{ij,1}$ is obtained and stored using streamed data encoded using Encoding Specification $S_1$ with the network in Network Condition Cij.

At step s670, a determination is made as to whether there are more Encoding Specifications to be used and tested while the network is in its current Network Condition Cij. If so, the process proceeds back to step s650 via step s675, at which the Encoding Specification value k is incremented. At step s650, the next Encoding Specification $S_2$ is selected, and step s660 is repeated in order to obtain and store Performance Measure $P_{ij,2}$ using streamed data encoded using Encoding Specification $S_2$ with the network in Network Condition Cij. This is repeated until it is found at step s670 that there are no more Encoding Specifications to be used and tested while the network is in its current Network Condition Cij. The process then proceeds to step s680.

At step s680, a determination is made as to whether the call has finished. If so, the process returns to step s610, and the next call is awaited.

If it is found at step s680 that the call has not finished, the process returns to step s620, again measuring individual data-transmission characteristics (c1, c2 . . . ) of the network and again mapping these into a Network Condition Cij. If it is then found at step s630 that the condition of the network has changed such that it is now in a Network Condition which has not been observed before, steps s640, s650, s660, s670 and s675 are repeated in order to obtain and store performance measures using streamed data encoded using each Encoding Specification with the network in the new Network Condition. If it is found at step s630 that the network is in a Network Condition which has been observed before, the process returns to step s620.

Looking at step s660 in more detail, the Performance Measure Pij,k (using data encoded using Encoding Specification Sk streamed via the network when in Network Condition Cij) may be calculated using a signal-based method or parameter-based computational model.

Selection of an Encoding Specification for a Communication Session

Referring back to FIG. 2, whether separate Data Capture, Profile Creation and Codec Testing phases are used or whether a single "learning" phase, it is possible to create two separate data sets, one relating to a set of Network Conditions and one relating to Codec Performance in relation to the different Network Conditions. These can be used to connect network performance data for a particular access technology or set of data transmission characteristics (a profile) to codec performance data associated with that profile. A "VoIP Service Optimisation" phase may then be performed in respect of an actual network (which may be the network used during the previous phase(s)) over which an actual communication session is to take place.

FIG. 7 shows an example of how a "VoIP Service Optimisation" or other such optimised Encoding Specification selection process may be performed using data obtained in a manner such as one of those described above, allowing one or more Encoding Specifications to be selected for use in respect of a communication session which is to involve streamed audio and/or video data. The selection process can be used to determine the optimal use of codecs or other Encoding Specifications (and if necessary, transcoding resources) within an operational VoIP service carried over a service provider's network, for example.

Starting from step s700 in FIG. 7, the entity performing the invention, which may be a conference bridge 42 such as that shown in FIG. 4 (but client terminals such as Client A, 32a and Client B, 32b may perform the process on their own behalf), measures or otherwise obtains data transmission (and possibly other) characteristics of the line over which the communication session is to take place (step s710).

At step s720, the stored Network Condition or profile whose characteristics best match the measured characteristics of the line over which the communication session is to take place is selected.

At this point, an encoding specification could be selected based on the performance measures obtained during the learning phase or phases when using the various different encoding specifications in respect of the network (or network emulator) used for testing when in the selected Network Condition. Alternatively, the selection process could be performed as shown in FIG. 7, as follows.

At step s730, the various possible codecs (or other such encoding specifications), each of which could be selected for use in encoding data to be streamed from and/or decoding data to be streamed to the terminal of a particular participant in a communication session, are put into an order based on their performance measures obtained during the learning phase or phases when using the various different encoding specifications in respect of the network (or network emulator) used for testing when in the selected Network Condition.

At step s740, it is established whether a call is being (or to be) made from or received at the terminal in question.

If the terminal in question is making a call, the first (or highest-rated) matching codec in the list may be selected (step s750) and used for encoding data to be sent to other participants.

If the terminal in question is one that will be receiving a call, the first matching codec in the list may be selected (step s760), and data received, which will have been encoded the selected codec, may be decoded using the same codec.

The caller's terminal may however send the receiver's terminal a filtered version of the list of codecs containing those appropriate to itself, to allow the receiver to choose the best codec from the filtered list that matches its requirements. Likewise, the receiver may respond with a list of codecs that it can offer, allowing the first or best matching codec (i.e. suitable for both or all participants' terminals) to be selected based on the ordered list.

At step s770, it is established whether a set time has elapsed since a line measurement was last made, i.e. since that data transmission (and possible other) characteristics of the line were last measured or otherwise obtained in step s710. If so, the process may return to step s710, with the data transmission (and possible other) characteristics being measured or otherwise obtained again, possibly leading to a different codec (or other such encoding specification) being selected for continuing the communication session. If not, the communication session may proceed with the currently-selected codec.

The first two steps above (steps s710 and s720) indicate that a regular automated measurement of line characteristics may be made in order to determine the best matching profile for that line. This measurement may be based on one of the algorithms for calculating burstiness described earlier. The subsequent determination of profile may be based exclusively on the average number of packets in each burst observed on that line, for example. Other statistical measures may also be used, however and, a threshold might be used before a line is considered to contain significant bursty packet loss, for example.

Once the profile is determined, corresponding codec performance data can be used to influence the negotiation of codecs selected whenever a call is made or received, in particular if call negotiation follows a standard protocol such as SDP, as described in IETF RFC 3264 (https://tools.ietf.org/html/rfc3264, for which examples are given in RFC 4317: https://tools.ietf.org/html/rfc4317). In the example shown in FIG. 7, the list of codecs available at a local client may be ordered by their performance with a specified line profile, with the first codec in the ordered list which is also offered by the remote client being chosen.

When a prescribed time-out (or other trigger mechanism) is reached, another automated measurement may be taken, and the best-matching profile may be re-evaluated.

The above is a simple example of how the configuration of a VoIP service could be influenced by pre-determined codec performance data on a per-call basis. However, this performance data could be used to determine more complex policy rules and codec choices within a converged network, such as:

1) Use the line profile to determine whether the call should be routed via a transcoder if a particular codec which is not supported by one client will provide a significant improvement in quality over a direct (not transcoded) path.
2) Use data from client profiles to centrally determine how transcoder resources could be dynamically allocated to ensure that the worst-performing lines can always use the most resilient codecs.

As will be appreciated, with most communications sessions, whether between two parties or between more than two parties, it is likely that some or all of the parties will be both sending and receiving data at the same time and/or at different times. While the primary decision to be taken according to preferred embodiments may be to determine a suitable encoding specification to be used by a particular party for that party's audio contributions or other such data to be streamed from that party to one or more other parties, the resulting streamed data will in general need to be decoded once it has been received by one or more other parties.

While it may be found that a decision taken in respect of the communication path between two or more parties is that each should use the same encoding specification, or that the respective parties should use compatible encoding specifications, it may be found that the encoding specification found to be most appropriate for one party is inapplicable for one or more other parties. With more than two participants to a communication session, it becomes more likely that different encoding specifications may be optimal for communication paths between different pairs of participants, as the paths may not be similar or the same.

In relation to such cases, it may be appropriate to select the encoding specification which is applicable to both or all parties which provides the best compromise. In other cases, it may be appropriate for the parties to use different, incompatible encoding specifications, and for transcoders or transcoding resources to be used, at a conference bridge, for example, or in the ISP network.

As indicated above, preferred embodiments are applicable in relation to communication sessions where data is streamed directly between respective participants as well as in relation to communication sessions where data is streamed between each participant and a conference bridge which may also act as a control unit in respect of the communication session itself and/or in respect of the process of selecting one or more codecs or encoding specifications for the communication session.

FIG. 8 shows the entities that may be involved in a communication session which is to take place via a conference bridge and/or control unit. In this example, three participants are shown, namely Client A, 82a, which in this case is a mobile device, and Client B, 82b and Client C, 82c, which in this case are computer devices capable of VoIP telephony. The respective clients/participants 82 are connected to the Internet 80 (and via that, to each other) via respective access networks (in this example, Access Network A, 80a, Access Network B, 80b, and Access Network C, 80c), in respect of which performance measures have been obtained during a learning phase as described earlier, and data from each is streamed to the others via a conference bridge and/or control unit 85, which contains or has access to data stores from which performance measures 86 and profile data 87 from such a learning phase may be obtained. The conference bridge and/or control unit 85 may be the same entity that has controlled the learning phase and has obtained the performance measures itself (e.g. the test server 30 shown in FIG. 3), or may be a separate entity with access to the stored data.

Referring to FIG. 9, this shows an example of how encoding specifications and transcoding resources may be selected using data obtained during a learning phase according to a preferred embodiment, in particular in cases where different encoding specifications may be appropriate or applicable for different participants in a communication session. In scenarios such as audio-conferencing involving a conference bridge, the selection process may be performed under the control of a suitably-adapted conference bridge and/or control unit 85 such as that shown in FIG. 8, for example, or by a separate control entity such as the test server 30 shown in FIG. 3.

Starting from step s900, the control entity identifies or receives indications of the participants who will be involved in the communication session in question (step s903). In this example, three participants are shown, namely Client A, 82a, Client B, 82b and Client C, 82c as shown in FIG. 8.

At step s906, the control entity selects the network or the specific network line or lines that will be used for the communication session. This may involve selecting network paths directly linking respective participants, selecting network paths linking respective participants to itself or to a separate conference bridge, or selecting a network (which may be a Virtual Private Network (VPN), for example) across which the communication session is to take place, for example.

At step s910, the control entity measures or otherwise obtains measurements of the chosen data-transmission characteristics in respect of the selected network, or in respect of the selected line(s) across it.

At step s920, the control entity selects the stored Network Condition or profile whose characteristics best match those of the selected network or network lines, selecting from those Network Conditions or profiles in respect of which performance measures have previously been obtained when streaming data encoded using different codecs across the test network. (NB Where the communication session is to take place over a number of different lines (e.g. between respective participants and a conference bridge), a Network Condition or profile may be selected in respect of each, or an overall Network Condition or profile may be selected which best matches the data-transmission characteristics of the network through which the lines pass.)

At step s930, the control entity select the best-performing codec (or a list of the best-performing codecs) for the selected Network Condition or profile, based on the stored performance measures obtained in respect of different codecs when the test network was in the selected Network Condition or profile. (Where different profiles have been selected in respect of different lines, this may be performed in respect of each.)

At step s935, the control entity establishes whether the selected codec for a line or for a network is applicable for both or all parties who are to participate in the communication session using the line or network in question. This may take into account the technical capabilities of the terminals of the respective parties (i.e. the processing requirements of some codecs may be too high for some client devices, for example, or some codecs may be incompatible with some devices for others reasons), and/or may take account of the fact that some codecs may require license fees to be paid.

If it is found at step s935 that the selected (i.e. best-performing) codec is applicable for both or all parties, or that a suitable codec will serve as a compromise for both/all parties, that codec is selected for use by both/all parties, who then both/each implement it for encoding and decoding data to be sent/received during the communication session (step s940). The communication session can then take place (step s980) without the need for transcoding.

If it is found at step s935 that the selected codec is not applicable for both or all parties, a second, different codec may be selected in a corresponding manner for use by any parties for whom the first codec is inapplicable (step s950).

Those parties may then implement the second codec for encoding and decoding data to be sent/received during the communication session (step s970), but if the respective codecs are not compatible (i.e. if one codec will not be able to decode data encoded by the other prior to being streamed), transcoding resources may need to be provided. In such cases, an appropriate transcoder is selected at step s960 in respect of each pair of incompatible codecs, and the communication session then takes place (step s980) with the respective parties using their respective codecs for encoding and decoding, and with the selected transcoder(s) being used to convert the streamed data between them accordingly.

In either case, the selection process ends at step s990.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of selecting an encoding specification for encoding audio and/or video data to be streamed from a sender to a receiver via a network, the method comprising:
   in respect of a monitored network in each of a plurality of monitored network conditions, respective monitored network conditions being characterised by different combinations of data-transmission characteristics of at least two different types, obtaining a performance measure in respect of each of a plurality of different encoding specifications, the performance measure in respect of the monitored network when in a particular monitored network condition and in respect of a particular encoding specification being obtained by applying a predetermined performance measuring process in respect of audio and/or video data encoded using said encoding specification and streamed via the monitored network when in said monitored network condition;
   in respect of a network over which audio and/or video data is subsequently to be streamed from a sender to a receiver, obtaining data-transmission characteristics of said at least two different types in respect of said network and selecting a corresponding one of said monitored network conditions in dependence on the data-transmission characteristics of said at least two different types obtained in respect of said network over which said data is to be streamed and on the combination of data-transmission characteristics of said at least two different types which characterised the monitored network when in said corresponding monitored network condition; and
   selecting an encoding specification for encoding said data to be streamed, the selection of said encoding specification being made in dependence on the performance measures obtained using said plurality of encoding specifications in respect of said monitored network when in said selected corresponding monitored network condition.

2. A method according to claim 1 wherein the combinations of data-transmission characteristics of at least two different types by which a network condition is characterised include one or more characteristics selected from the following:
   characteristics associated with communication speed;
   characteristics associated with communication delay and/or delay variation;
   characteristics associated with reliability;
   characteristics associated with data loss;
   characteristics associated with communications quality.

3. A method according to claim 1 wherein the network over which audio and/or video data is subsequently to be streamed is the network monitored in the step of obtaining performance measures.

4. A method according to claim 1 wherein the method further comprises selecting a decoding specification for decoding audio and/or video data that has been streamed from the sender towards the receiver via the network.

5. A method according to claim 4 wherein the decoding specification is selected in dependence on the encoding specification selected for encoding said audio and/or video data to be streamed from the sender to the receiver via the network.

6. A method according to claim 1 wherein the performance measures obtained in respect of the monitored network in respect of a particular encoding specification are obtained by applying a selected one of a plurality of predetermined performance measuring processes, the performance measuring process to be applied in respect of a particular encoding specification being selected in dependence on the encoding specification.

7. A method according to claim 1 wherein the method further comprises selecting an encoding specification for encoding audio and/or video data to be streamed from said receiver to said sender via the network, the encoding specification for encoding audio and/or video data to be streamed from said receiver to said sender being selected independently of the encoding specification selected for encoding audio and/or video data to be streamed from the sender to the receiver.

8. A method according to claim 7 wherein the method further comprises selecting a transcoding specification in the event that the encoding specification selected for encoding audio and/or video data to be streamed from said receiver to said sender differs from and/or is incompatible with the encoding specification selected for encoding audio and/or video data to be streamed from the sender to the receiver.

9. A method according to claim 8 wherein the transcoding specification selected in the event that the encoding specification selected for encoding audio and/or video data to be streamed from said receiver to said sender differs from and/or is incompatible with the encoding specification selected for encoding audio and/or video data to be streamed from the sender to the receiver is selected in dependence on the respective encoding specifications selected.

10. A method according to claim 1, the method further comprising encoding audio and/or video data to be streamed from a sender to a receiver via a network using the selected encoding specification.

11. A method according to claim 10, the method further comprising streaming the encoded data from said sender to said receiver via said network.

12. A method according to claim 1 of selecting one or more encoding specifications for encoding audio and/or video data to be streamed between participants in a multi-party communication session, the communication session to involve audio and/or video data being streamed via at least one network and via a communication session control unit, the method comprising selecting a first encoding specification for encoding audio and/or video data to be streamed from one or more of said participants to said communication session control unit via a network.

13. A method according to claim 12 wherein the method further comprises selecting one or more other encoding specifications for encoding audio and/or video data to be streamed from one or more others of said participants to said communication session control unit via a network, the selection of said one or more other encoding specifications being at least partly dependent on the selection of the first encoding specification.

14. Apparatus for selecting an encoding specification for encoding audio and/or video data to be streamed from a sender to a receiver via a network, the apparatus comprising a processor at least configured to:
  in respect of a monitored network in each of a plurality of monitored network conditions, respective monitored network conditions being characterised by different combinations of data-transmission characteristics of at least two different types, obtain a performance measure in respect of each of a plurality of different encoding specifications, the performance measure in respect of the monitored network when in a particular monitored network condition and in respect of a particular encoding specification being obtained by applying a predetermined performance measuring process in respect of audio and/or video data encoded using said encoding specification and streamed via the monitored network when in said monitored network condition;
  in respect of a network over which audio and/or video data is subsequently to be streamed from a sender to a receiver, obtain data-transmission characteristics of said at least two different types in respect of said network and select a corresponding one of said monitored network conditions in dependence on the data-transmission characteristics of said at least two different types obtained in respect of said network over which said data is to be streamed and on the combination of data-transmission characteristics of said at least two different types which characterised the monitored network when in said corresponding monitored network condition; and
  select an encoding specification for encoding said data to be streamed, the selection of said encoding specification being made in dependence on the performance measures obtained using said plurality of encoding specifications in respect of said monitored network when in said selected corresponding monitored network condition.

15. A non-transitory computer-readable storage medium comprising computer program code to, when loaded into a computer system and executed thereon, cause the computer to perform the steps of a method as claimed in claim 1.

* * * * *